United States Patent
Romkee

[11] Patent Number: 5,814,724
[45] Date of Patent: Sep. 29, 1998

[54] METHOD AND DEVICE FOR DETERMINING PISTON ENGINE WEAR

[76] Inventor: David Scott Romkee, 1700 Chestnut St., Santa Clara, Calif. 95054

[21] Appl. No.: 767,996

[22] Filed: Dec. 13, 1996

[51] Int. Cl.⁶ .................................................. G01M 15/00
[52] U.S. Cl. ........................... 73/119 R; 33/603; 33/605; 33/DIG. 15
[58] Field of Search .......................... 73/47, 49.7, 119 R, 73/120; 33/601, 603, 605, DIG. 15

[56] References Cited

U.S. PATENT DOCUMENTS

| | | | |
|---|---|---|---|
| 1,683,710 | 9/1928 | Zitzmann | 73/119 R |
| 1,758,271 | 5/1930 | Zitzmann | 73/119 R |
| 1,888,454 | 11/1932 | Edson | 73/119 R |
| 2,072,984 | 3/1937 | Haskins | 73/116 |
| 2,386,179 | 10/1945 | Andrus | 33/605 |
| 2,511,392 | 6/1950 | Worel | 73/116 |
| 2,747,289 | 5/1956 | Jenkins | 33/605 |
| 2,932,900 | 4/1960 | Hanlon . | |
| 2,942,350 | 6/1960 | Sloan . | |
| 3,005,265 | 10/1961 | Martin, Jr. et al. . | |
| 3,144,718 | 8/1964 | Brehm . | |
| 3,146,528 | 9/1964 | Goulet et al. . | |
| 3,220,244 | 11/1965 | Donnelly . | |
| 3,279,082 | 10/1966 | Cook et al. . | |
| 3,765,098 | 10/1973 | Schafer, Sr. | 33/601 |
| 3,768,170 | 10/1973 | Schafer, Sr. | 33/601 |
| 3,820,386 | 6/1974 | Grikscheit et al. | 33/601 |
| 3,852,887 | 12/1974 | Henrick | 33/601 |
| 4,348,665 | 9/1982 | Rode et al. . | |
| 4,468,956 | 9/1984 | Merlo | 73/120 |
| 4,633,707 | 1/1987 | Haddox | 73/47 |
| 4,806,915 | 2/1989 | Rasmussen | 73/119 R |
| 4,928,400 | 5/1990 | Schuh | 33/605 |
| 5,198,763 | 3/1993 | Konishi . | |
| 5,224,273 | 7/1993 | Dellas . | |

FOREIGN PATENT DOCUMENTS

| | | |
|---|---|---|
| 36 23 977 | 1/1988 | Germany . |
| 567081 | 7/1977 | U.S.S.R. . |
| 587313 | 1/1978 | U.S.S.R. . |
| 783561 | 11/1980 | U.S.S.R. . |
| 805052 | 2/1981 | U.S.S.R. . |
| 1193437 | 11/1985 | U.S.S.R. . |
| 1265459 | 10/1986 | U.S.S.R. . |
| 1538034 | 1/1990 | U.S.S.R. . |

*Primary Examiner*—Ronald L. Biegel
*Assistant Examiner*—Eric S. McCall
*Attorney, Agent, or Firm*—Richard C. Litman

[57] ABSTRACT

A device and a method for determining big end bearing and wrist pin bearing wear in a piston engine without complete disassembly of the engine. The device includes a probe rod which moves in response to the movements of the piston in a cylinder being tested. The position of the probe rod is transduced to an electrical signal which is inputted to a microcomputer. The method uses the piston position obtained via the probe rod and the crank throw angle to calculate the total amount of wear in the big end bearing and the wrist pin bearing. The results of the calculation are then sent to a display which forms part of the bearing inspection device of the present invention.

14 Claims, 7 Drawing Sheets

METHOD AND DEVICE FOR DETERMINING PISTON ENGINE WEAR

BACKGROUND OF THE INVENTION

1. Field of the Invention

The present invention relates to a method and apparatus for determining the amount of wear at the wrist pin and big end bearings of a reciprocating piston engine.

2. Introduction and Description of Prior Art

Typical connecting rod bearings of reciprocating piston engines have normal clearances on the order of 0.005 to 0.008 inch. This clearance allows the correct volume of pressurized oil into the bearing gap. When this bearing clearance increases too much because of wear, an excessive amount of the pressurized engine oil flows through these bearing clearances. The excessive flow through the bearing gap causes a drop in the oil pressure of the lubricating system of the engine and a concurrent reduction in the volume of lubricating oil supplied to the other parts of the engine. The reduction in the volume of lubricating oil supplied to the other parts of the engine can lead to catastrophic engine failure.

In addition, excessive play between the crank throw and the big end of the connecting rod and between the wrist pin and small end of the connecting rod, leads to the connecting rod bearings being hammered by the wrist pin and/or the crank throw as the crank shaft rotates. The impacts of the wrist pin and the crank throw on the connecting rod bearings can lead to fracture of the connecting rod and consequently engine failure. It is therefore desirable to have a means for periodically testing the connecting rod bearings so that the connecting rods may be replaced when they are too worn, but before the connecting rod bearing wear is manifested in the form of an engine failure.

Most current bearing inspection tools require that the engine be completely disassembled before the bearings can be tested. The time consuming nature and cost of complete engine disassembly precludes the use of these bearing inspection tools for routine periodic testing of connecting rod bearings. The only other techniques in widespread use for ascertaining the level of engine wear, without complete disassembly of the engine, are cylinder compression and leak tests. However, the compression and leak tests are more indicative of the amount of piston ring, valve seat, and cylinder wall erosion than they are of connecting rod bearing wear.

U.S. Pat. No. 2,932,900, issued to Paul C. Hanlon on Apr. 19, 1960, shows a device for determining axial play in ball bearing sets. Hanlon does not show a device for calculating bearing wear from piston position in an internal combustion engine.

U.S. Pat. No. 2,942,350, issued to John Richard Sloan on Jun. 28, 1960, shows a gauge for determining radial play in anti-friction bearings. Sloan does not show a device for calculating bearing wear from piston position in an internal combustion engine.

U.S. Pat. No. 3,005,265, issued to Wade H. Martin, Jr. et al. on Jun. 28, 1961, shows a bearing inspection tool for inspecting isolated anti-friction bearings. Martin et al. do not show a device for calculating bearing wear from piston position in an internal combustion engine.

U.S. Pat. No. 3,144,718, issued to Paul D. Brehm on Aug. 18, 1964, shows a radial play gauge for inspecting isolated anti-friction bearings. Brehm does not show a device for calculating bearing wear from piston position in an internal combustion engine.

U.S. Pat. No. 3,146,528, issued to Ralph A. Goulet et al. on Sep. 1, 1964, shows a bearing tester for testing isolated anti-friction bearings. Goulet et al. do not show a device for calculating bearing wear from piston position in an internal combustion engine.

U.S. Pat. No. 3,220,244, issued to Paul J. Donnelly on Nov. 30, 1965, shows a device for measuring wear of the thrust bearings of a rotating shaft. Donnelly does not show a device for calculating bearing wear from piston position in an internal combustion engine.

U.S. Pat. No. 3,279,082, issued to Arthur J. Cook et al. on Oct. 18, 1966, shows a bearing clearance gauge for testing isolated anti-friction bearings. Cook et al. do not show a device for calculating bearing wear from piston position in an internal combustion engine.

U.S. Pat. No. 4,348,665, issued to Heinz A. Rode et al. on Sep. 7, 1982, shows an apparatus for monitoring wear in the trunnion bearings of a basic oxygen furnace. Rode et al. do not show a device for calculating bearing wear from piston position in an internal combustion engine.

U.S. Pat. No. 5,198,763, issued to Yoshiaki Konishi on Mar. 30, 1993, shows a sensors incorporated into a shaft bearing to monitor its wear. The sensors of Konishi are not applicable to a shaft bearing that is not specially designed to house the sensors. Also, Konishi does not show a device for calculating bearing wear from piston position in an internal combustion engine.

U.S. Pat. No. 5,224,273, issued to Athanasios Dellas on Jul. 6, 1993, shows an apparatus for measuring bearing clearance in an isolated bearing. Dellas does not show a device for calculating bearing wear from piston position in an internal combustion engine.

Soviet Patent-type Document Number 567081 dated July 1977, shows an apparatus for measuring the gap between paired bearings. Soviet Document '081 does not show a device for calculating bearing wear from piston position in an internal combustion engine.

Soviet Patent-type Document Number 587313 dated January 1978, shows an apparatus for measuring the radial gap of ball bearings. Soviet Document '313 does not show a device for calculating bearing wear from piston position in an internal combustion engine.

Soviet Patent-type Document Number 783561 dated November 1980, shows an apparatus for checking the race clearance gap of ball bearings. Soviet Document '561 does not show a device for calculating bearing wear from piston position in an internal combustion engine.

Soviet Patent-type Document Number 805052 dated February 1981, shows a system for determining the connecting rod bearing wear in an internal combustion engine. Soviet Document '052 uses a contact attached to the connecting rod and a probe mounted in the crank case. Soviet Document '052 does not show a device for calculating bearing wear from piston position determined using a probe inserted through the cylinder head.

Soviet Patent-type Document Number 1193437 dated November 1985, shows an apparatus for measuring roller bearing axial play. Soviet Document '437 does not show a device for calculating bearing wear from piston position in an internal combustion engine.

Soviet Patent-type Document Number 1265459 dated October 1986, shows an apparatus for measuring radial play of bearings. Soviet Document '459 does not show a device for calculating bearing wear from piston position in an internal combustion engine.

German Patent-related Document Number 36 23 977 by Rudolph Diem, dated Jan. 21, 1988, shows an apparatus for measuring radial clearance in roller bearings. Diem does not show a device for calculating bearing wear from piston position in an internal combustion engine.

Soviet Patent-type Document Number 1538034 dated January 1990, shows a system for diagnostic checking of roller bearing free play using vibration measurements. Soviet Document '034 does not show a device for calculating bearing wear from piston position in an internal combustion engine.

None of the above inventions and patents, taken either singularly or in combination, is seen to describe the instant invention as claimed. Thus a piston engine bearing inspection device solving the aforementioned problems is desired.

SUMMARY OF THE INVENTION

The present invention is directed to a device and a method for determining big end bearing and wrist pin bearing wear in a piston engine without complete disassembly of the engine. The device includes a probe rod which moves in response to the movements of the piston in a cylinder being tested. The position of the probe rod is transduced to an electrical signal which is inputted to a microcomputer. The method uses the piston position obtained via the probe rod and the crank throw angle to calculate the total amount of wear in the big end bearing and the wrist pin bearing. The results of the calculation are then sent to a display which forms part of the bearing inspection device of the present invention.

Accordingly, it is a principal object of the invention to provide a device for determining the amount of big end bearing and wrist pin bearing play without disassembling the engine completely.

It is another object of the invention to provide a device for determining the amount of big end bearing and wrist pin bearing play which also incorporates means for measuring cylinder pressure.

It is a further object of the invention to provide a method for determining the amount of big end bearing and wrist pin bearing play by measuring piston position within a cylinder of an internal combustion engine.

Still another object of the invention is to provide a method for determining the amount of big end bearing and wrist pin bearing play by dynamically measuring pressure within a cylinder of an internal combustion engine.

It is an object of the invention to provide improved elements and arrangements thereof in a piston engine bearing inspections device and a method for its use for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
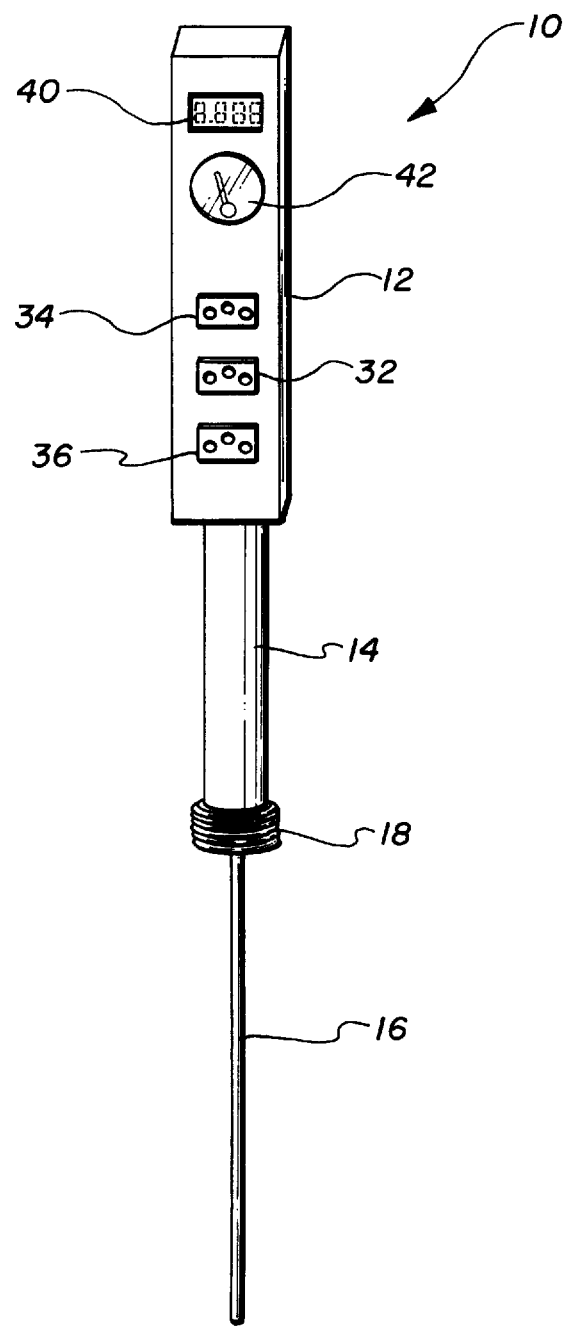
FIG. 1 is a perspective view of a piston engine bearing inspection device according to the present invention.
Figure 2:
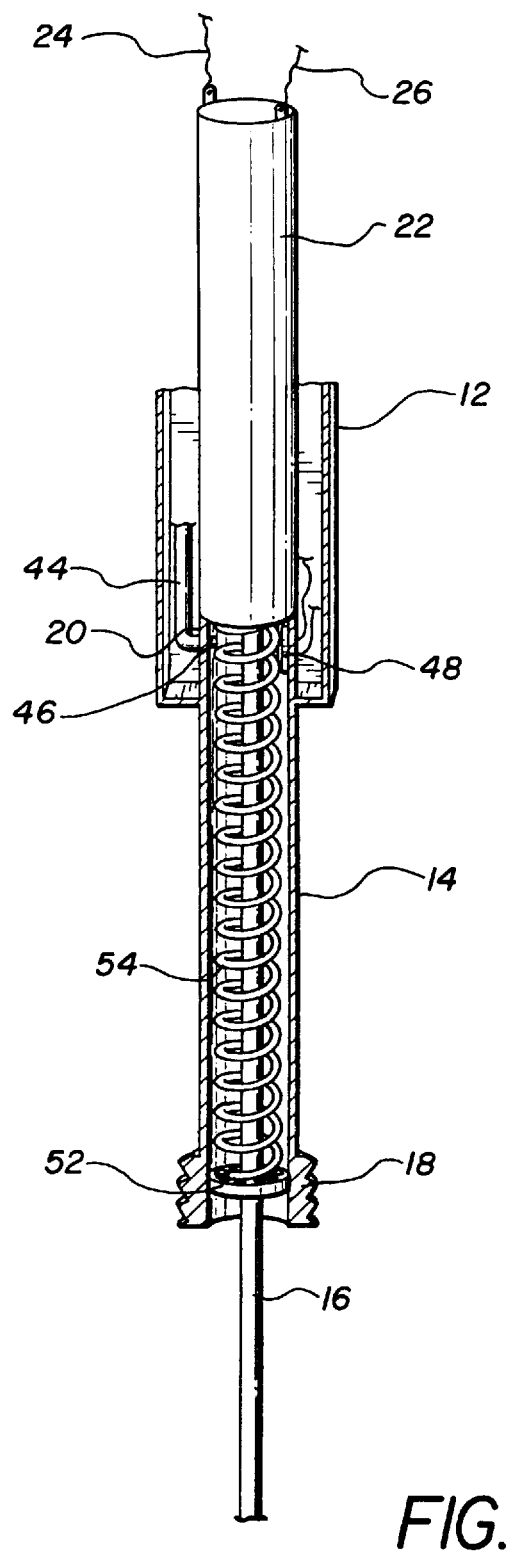
FIG. 2 is a fragmentary view of a piston engine bearing inspection device according to the present invention, partially broken away to reveal internal details.

Referring to FIGS. 1 and 2, the present invention relates to a method and a device 10 for determining the amount of wear at the wrist pin and big end bearings of a reciprocating piston engine. The device 10 includes a housing 12, a tubular extension 14, and a probe rod 16 slidably movable within the tubular extension 14. The end 18 of the tubular extension 14, distal from the housing 12, is provided with external screw threads which are matingly engageable with the spark plug hole, the glow plug hole, or the fuel injector hole of the cylinder of the engine being tested depending upon the type and geometry of the engine. The end 20 of the tubular extension 14, distal from the threaded end 18, is located inside the housing 12. Some form of well known linear position sensor 22 is provided at the end 20 of the tubular extension 14 located within the housing 12. The end of the probe rod 16 which passes into the housing 12, is operationally engaged to the linear position sensor 22 such that the electrical output of the linear position sensor 22 is a function of the linear position of the probe rod 16 relative to the housing 12. Thus, the electrical output of the linear position sensor 22 is indicative of the linear position of the probe rod 16 relative to the housing 12. When mounted to the cylinder head of an engine under test such that the probe rod 16 is in contact with the crown of the piston in the cylinder being tested, the linear position sensor 22 becomes in effect a piston position transducer. The electrical output of the linear position sensor 22 is communicated to the data processing circuitry, i.e. the circuitry including the analog to digital converter 28 and the microcomputer 30 (see FIG. 5), of the device 10 via wires 24 and 26. The microcomputer 30 uses the known dimensions of the engine when new and the output of the linear position sensor 22 to calculate the total wear in the connecting rod bearings as will be explained later. The probe rod 16 is operationally engaged to the linear position sensor 22 throughout the full range of motion of the probe rod 16.

Figure 5:
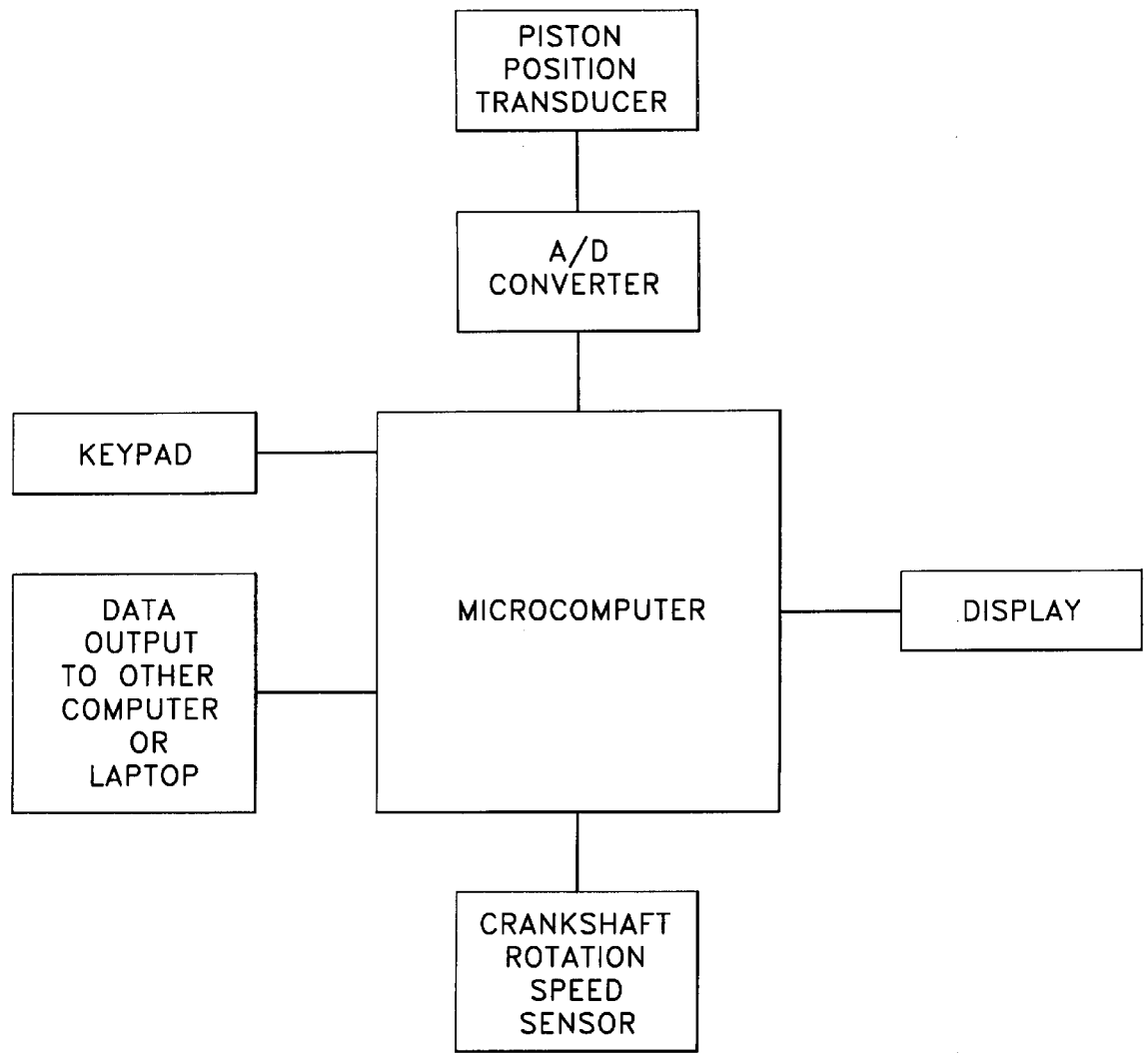
FIG. 5 is a schematic diagram of the data processing circuitry of a piston engine bearing inspection device according to the present invention.

The linear position sensor 22 can be of any well known type suitable for transducing the relative linear position of the probe rod 16 into an electric signal. In the illustrated embodiment a linear variable differential transformer (LVDT) is used as the linear position sensor 22. Referring to FIGS. 1 and 5, the microcomputer 30 and the A/D converter 28 are also housed in the housing 12. On the exterior of the housing 12 are provided a keypad connection port 32, an engine timing signal connection port 34, and a computer interface port 36. The engine timing signal connection port 34 can be used to connect an output from the engine's ignition system to the device 10 to provide a timing signal indicative of the crank shaft angular position. Alternatively, a clamp-on ammeter could be placed around a spark plug wire, or a temporary timing circuit commonly known in the art as a crank shaft trigger could be secured to the crank shaft main pulley to provide the engine timing signal. All these and other suitable timing devices are collectively referred to herein as the crank shaft timing sensor 38.

The keypad connection port or data input port 32 is used to allow data regarding the engine under test to be inputted into the microcomputer 30 for use in calculating the total wear of the connecting rod bearings. This data can for example be the dimensions of the engine under test when new, as supplied by the manufacturer of the engine.

The computer interface port 36 allows the output of the linear position sensor 22 or the test results, as calculated by microcomputer 30, to be outputted to another computer 50 such as a laptop computer for further analysis, storage, output to a printer, output to a computer monitor, or any combination of these operations. Also positioned on the exterior of the housing 12 is a display device 40 such as a liquid crystal display (LCD) to indicate the test results such as the total wear of the connecting rod bearings calculated by the microcomputer 30.

The device 10 also includes at least one sensor for measuring the compression ratio and/or the leakage rate of the cylinder being tested. This sensor can be a mechanical pressure gauge or compression tester 42 which communicates with the lumen of the tubular extension 14 via a tube 44 which in turn communicates with the hole 46 (see FIGS. 1 and 2). Alternatively or additionally, a piezoelectric or strain gauge type pressure sensor 48 can be provided in the wall of the tubular extension 14. The pressure sensor 48 provides an electrical output that is indicative of the pressure within the cylinder being tested. The output of the sensor 48 is then supplied to the microcomputer 30 via an A/D converter. The microcomputer 30 can then output the cylinder pressure or compression ratio to the display 40, or by monitoring cylinder pressure over time the microcomputer 30 can calculate a leakage rate for the cylinder being tested and then the calculated leakage rate can be displayed on the display 40. Thus, using the device 10, a comprehensive analysis of the state of wear of almost any engine can be obtained with one simple test.

Referring to FIGS. 1 and 2, the probe rod 16 can have a flange 52 which bears against the interior wall of tubular extension 14. The flange 52 provides added support to reduce the lateral deflection of the probe rod 16, and thus reduce the possibility of the probe rod 16 binding within the tubular extension 14. The flange 52 is ventilated to allow unobstructed fluid communication between the interior of the engine cylinder and both the hole 46 and the pressure sensor 48.

Under most circumstances gravity is adequate to maintain the probe rod 16 in contact with the piston crown. However, if desired, a very light spring 54 can be provided between the linear position sensor 22 and the flange 52 to help maintain the probe rod 16 in contact with the piston crown during the portion of the engine cycle during which measurements are being made. The spring 54 should be light enough such that the pressure of the spring 54 is insufficient to affect the movement of the piston in the cylinder being tested, i.e. the force of the spring 54 is insufficient to overcome the friction between the piston rings and the wall of the cylinder being tested.

Figure 3A:
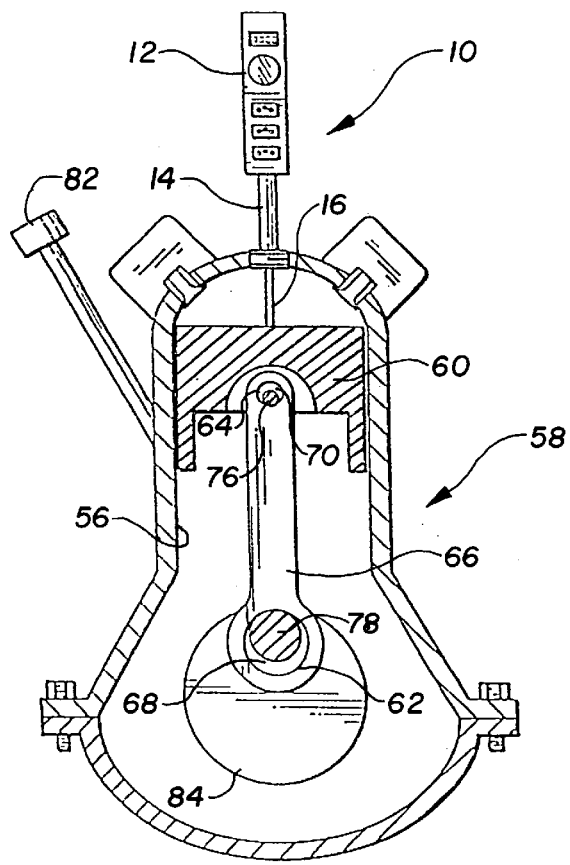
FIG. 3A is an environmental view of a piston engine bearing inspection device according to the present invention applied to a hemispherical head cylinder at bottom dead-center.
Figure 3B:
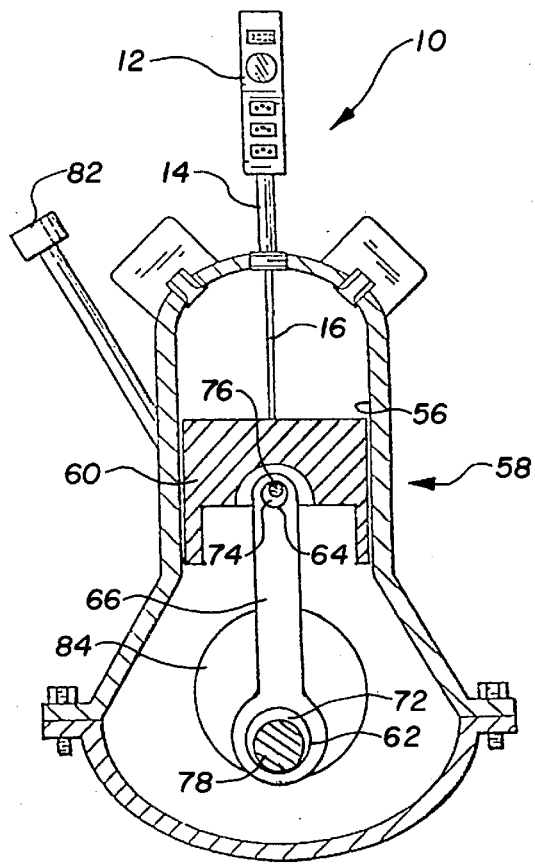
FIG. 3B is an environmental view of a piston engine bearing inspection device according to the present invention applied to a hemispherical head cylinder at bottom dead-center.

Referring to FIGS. 3A and 3B, a cylinder 56 of a piston engine 58 can be seen. The piston engine 58 is of the hemi-head type with a centrally located spark plug hole to which the device 10 is secured. This type of engine geometry allows the probe rod 16 to perpendicularly contact the crown of the piston 60. Note from the illustrations that the big-end bearing 62 and the wrist pin bearing 64, at the small end of the connecting rod 66, are not exactly of the same diameter as the crank shaft throw 78 and the wrist pin 76, leaving gaps 68, 70, 72, and 74. The combined total of the clearance in the connecting rod bearings 62 and 64 is given by the sum of the gaps 68 and 70 or the sum of the gaps 72 and 74. This total clearance can also be regarded as the free play of the piston 60 or of the wrist pin 76 relative to the crank shaft throw 78. As shown in FIG. 3A, at top dead-center (TDC) the wrist pin 76 is closest to the crank throw 78. As shown in FIG. 3B, at bottom dead-center (BDC) the wrist pin 76 is farthest from the crank throw 78. The difference between the center to center distance, measured between the wrist pin 76 and the crank throw 78, at BDC and that center to center distance at TDC gives the total clearance for the connecting rod bearings. With the device 10 properly calibrated, the amount of projection of the probe rod 16 from the tubular extension 14 will provide the distance between the piston crown and the spark plug opening in the cylinder head. The dimensions of the cylinder head and wall, the piston and wrist pin, and the crank shaft and crank throw are known and can be obtained from the manufacturer for the particular model of engine being tested. Also, the location of the axis of rotation of the crank shaft relative to the cylinder is known and can be obtained from the manufacturer. This geometric data regarding the engine is entered into the microcomputer 30 using the keypad 80 (see FIG. 5). Using the known cylinder dimensions, the known piston and wrist pin dimensions, the known crank shaft dimensions and location, and the measured piston position within the cylinder, and given the fact that the crank shaft is at TDC, the microcomputer 30 can calculate the center to center distance measured between the wrist pin 76 and the crank throw 78 at TDC. Similarly, using the known cylinder dimensions, the known piston and wrist pin dimensions, the known crank shaft dimensions and location, and the measured piston position within the cylinder, and given the fact that the crank shaft is at BDC, the microcomputer 30 can calculate the center to center distance measured between the wrist pin 76 and the crank throw 78 at BDC. By subtracting the center to center distance between the wrist pin 76 and the crank throw 78 at TDC from the center to center distance between the wrist pin 76 and the crank throw 78 at BDC the total clearance of the connecting rod bearings can be obtained. This total clearance is then displayed on the display 40. If this total clearance is within manufacturer specified tolerances the connecting rod is retained, otherwise the connecting rod must be replaced.

Note that the timing of the measurement is critical to the success of this method. The measurements must be made at TDC and BDC. The timing signal from the crank shaft timing sensor 38, which can be the ignition distributer 82 or one of the means mentioned previously, is used by the microcomputer 30 to ensure that the measurements are taken at TDC and BDC. Also the crank shaft 84 must be spun at a relatively low and constant rotational speed. The low rotational speed, preferably less than 100 RPM, is recommended to minimize the effects of the inertia of the probe rod 16 on the accuracy of the measurements. Rotating the crank shaft 84 at a constant rotational speed allows the calculation of the angular position of the crank throw at any instant of time. For example consider the typical engine where the ignition spark current is sent from the ignition system at thirty degrees before TDC. If the spark ignition current is used as the timing signal, it will be known that the crank throw is at thirty degrees before TDC each time a timing signal is received by the microcomputer 30. The microcomputer 30 can be programmed to sample the output of the linear position sensor for several cycles after the period of the timing signal becomes relatively constant. Given the fact that the number of crank rotations per period of the timing signal is a known characteristic of the engine, that constant period can be used to calculate the rotational speed of the crank shaft. The calculated rotational speed is stored prior to sampling of the linear position sensor output. Sampling is initiated at a timing signal or event. By using the rotational speed in units of radians per second and multiplying the rotational speed by the elapsed time measured from the timing event and adding the known angular position of the crank throw at the timing event, in this example thirty degrees ahead of TDC or negative $\pi/6$ radians, the angular position of the crank throw, relative to TDC, at any given instant of time can be obtained. Crank throw angular positions, relative to the timing event, corresponding to TDC and BDC are $\pi/6$ and $7\pi/6$ respectively. Dividing these angular positions by the calculated rotational speed, will yield the times at which the output of the linear position sensor must be sampled to obtain the piston positions at TDC and BDC.

Using the piston positions at TDC and BDC the stroke of the piston can be obtained. The greater the clearances between the crank throw 78 and the big-end bearing 62 and between the wrist pin 76 and the small-end bearing 64, the greater the diminishment of the piston stroke. If the stroke length of the piston is less than, a manufacturer's specified minimum stroke length for that model engine, then the connecting rod must be replaced. Also, the measured stroke length subtracted from the manufacturer's specified stroke length, for a new engine of the same make and model, gives the total amount of wear in the connecting rod bearings of the engine being tested relative to the connecting rod bearings of a new engine of the same make and model.

Figure 4A:
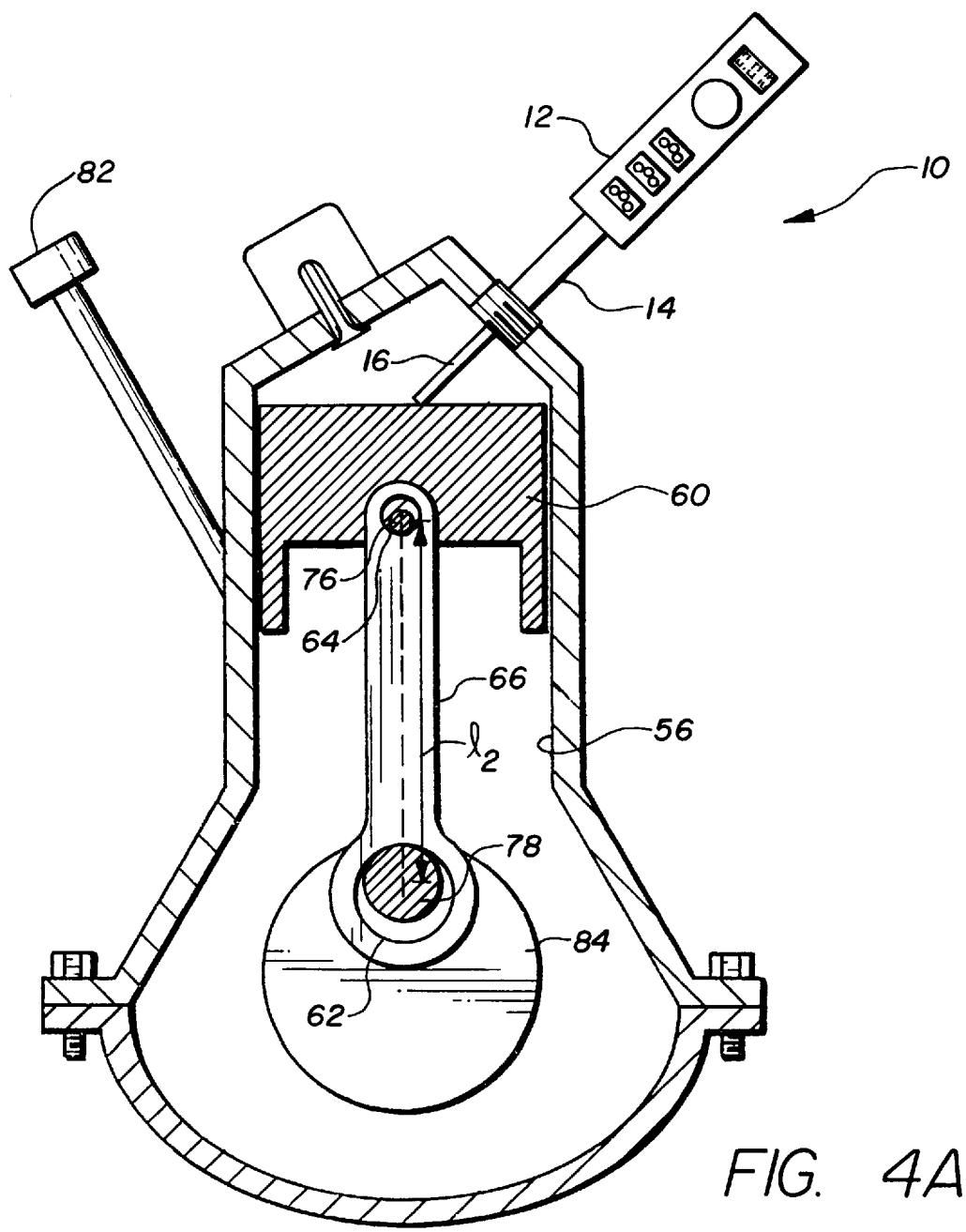
FIG. 4A is an environmental view of a piston engine bearing inspection device according to the present invention applied to a wedge-shaped head cylinder at top dead-center.
Figure 4B:
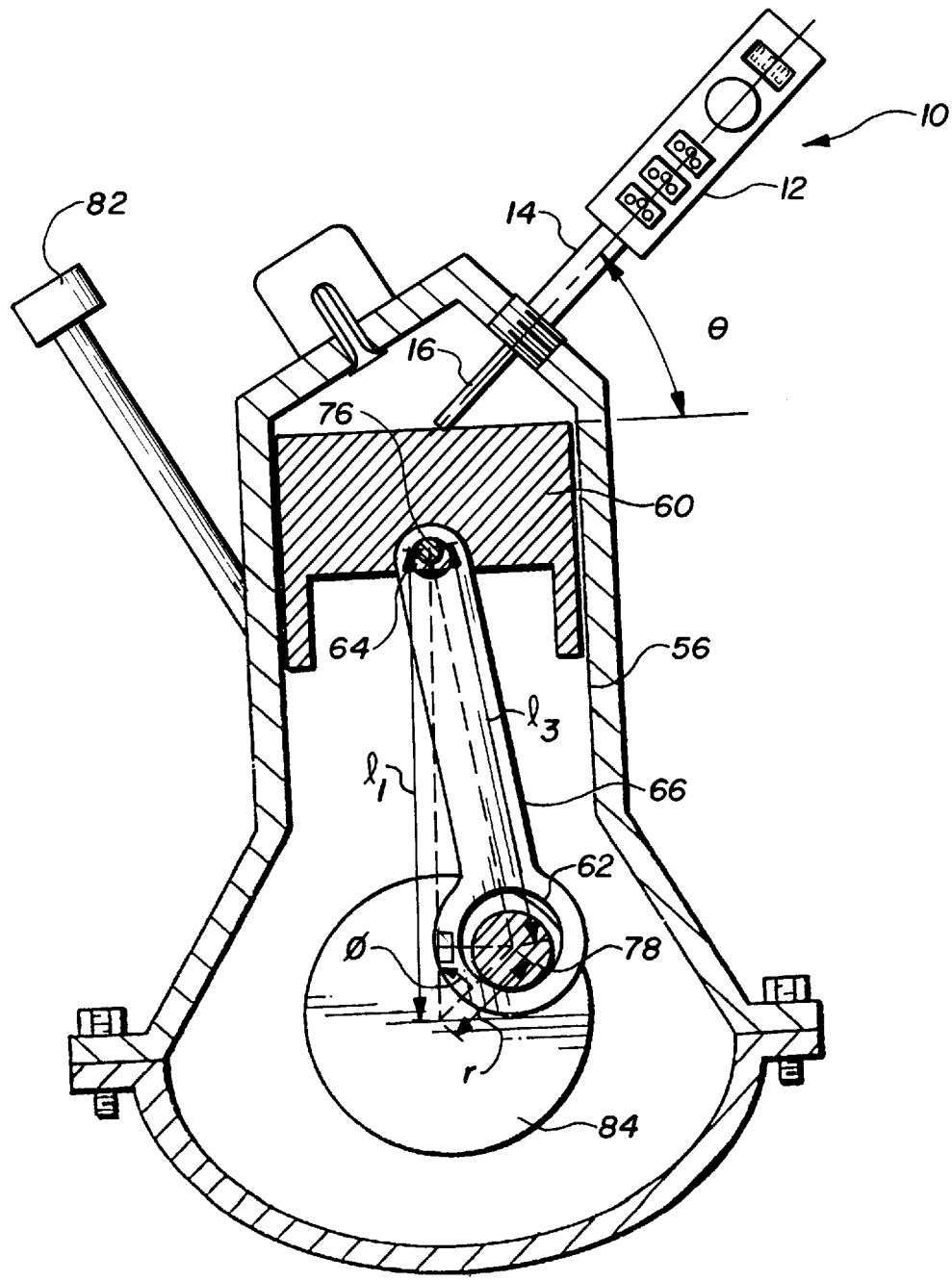
FIG. 4B is an environmental view of a piston engine bearing inspection device according to the present invention applied to a wedge-shaped head cylinder at the end of the top "flat spot" in the piston's movement.

Alternatively, the need for a timing signal can be dispensed with altogether by using the linear position sensor output itself for both timing and calculation of the rotational speed of the crank shaft. Consider the case where there is a clearance between the crank throw 78 and the big-end bearing 62 and/or between the wrist pin 76 and the small-end bearing 64. For some time after TDC the piston will not move even though the crank shaft is rotating, because the clearances of the connecting rod bearings allow some free play between the piston and the crank throw which free play must be taken up before further rotation of the crank shaft 84 will pull the piston 60 down within the cylinder 56. This condition is illustrated in FIGS. 4A and 4B. These geometric realities result in a "flat spot" in the output signal of the linear position sensor 22, i.e. a period immediately following TDC during which the output of the linear position sensor 22 does not vary with time or crank shaft rotation. To use the output of the linear position sensor 22 in place of a timing signal, the microcomputer 30 can be programmed to sample the output of the linear position sensor for several cycles until the period of the linear position sensor signal becomes relatively constant. Then that constant period is used to calculate the rotational speed of the crank shaft, and the output of the linear position sensor 22 is sampled and stored for several cycles. The time at which the flat spot begins is used as the timing event. At the beginning of the flat spot the crank throw is at TDC or zero radians. By using the rotational speed in units of radians per second and multiplying the rotational speed by the elapsed time measured from the timing event, in this example the beginning of the flat spot, the angular position of the crank throw at any given instant of time during the piston cycle can be obtained.

Referring to FIGS. 4A and 4B, it can be seen that in certain engine designs contact between the probe rod 16 and the piston 60 cannot be maintained over the full stroke of the piston. Also in very large engines contact between the probe rod 16 and the piston 60 may not be maintained over the full stroke of the piston. In such situations the piston position relative to the access hole to which the device 10 is secured, can be obtained for at least a short period of time before TDC and at least a short period of time past the end of the post TDC flat spot. The signal from the linear position sensor 22 will still be periodic and regular but will have large flat periods, following the post TDC flat spot, corresponding to periods when the probe rod 16 is out of contact with the piston 60 and is maximally extended from the tubular extension 14. The maximal extension of the probe rod 16 may be limited by engine structures such as the cylinder wall and is not necessarily the limit to which the probe rod 16 can project from the tubular extension 14.

In the example illustrated in FIGS. 4A and 4B, to obtain the piston position relative to the access hole to which the device 10 is secured, the reading obtained from the linear position sensor 22 must be corrected by multiplying that reading by a correction factor of sin $\theta$. The angle $\theta$ can be obtained from manufacturer's specifications and entered into the microcomputer 30 using the keypad 80; $\theta$ being the angle, relative to the horizontal, of the access hole to which the device 10 is secured.

Once the piston position at TDC relative to the access hole to which the device 10 is secured is obtained, the distance (denoted $1_1$) from the center of the wrist pin 76 to the axis of rotation of the crank shaft 84 can be calculated using the aforementioned piston position and the geometric specifications of the engine as supplied by the manufacturer. The center to center distance measured between the wrist pin 76 and the crank throw 78 at TDC (denoted $1_2$) is then given by, $$1_2 = 1_1 - r \quad (1)$$

where r is the distance between the center of the crank throw 78 and the axis of rotation of the crank shaft 84.

The angular position $\phi$ of the crank throw 78 at the end of the post TDC flat spot can be calculated by multiplying the rotational speed of the crank shaft 84 by the duration of the post TDC flat spot. The rotational speed of the crank shaft 84 is obtained in the manner that was previously described. The duration of the post TDC flat spot is obtained from the output of the linear position sensor sampled and stored by the microcomputer 30 and is equivalent to the period of time beginning with TDC during which the output of the linear position sensor is substantially constant.

The center to center distance measured between the wrist pin 76 and the crank throw 78 at the end of the post TDC flat spot (denoted $1_3$) is then given by the following equation:

$$1_3 = [(r \sin \phi)^2 + (1_1 - r \cos \phi)^2]^{1/2} \quad (2)$$

Subtracting $1_2$ from $1_3$ yields the total clearance of the connecting rod bearings, $1_3$ essentially being equivalent to the center to center distance measured between the wrist pin 76 and the crank throw 78 at BDC. As before, if the total bearing clearance is in excess of the manufacturer's specified tolerances, the connecting rod must be replaced.

Figure 6:
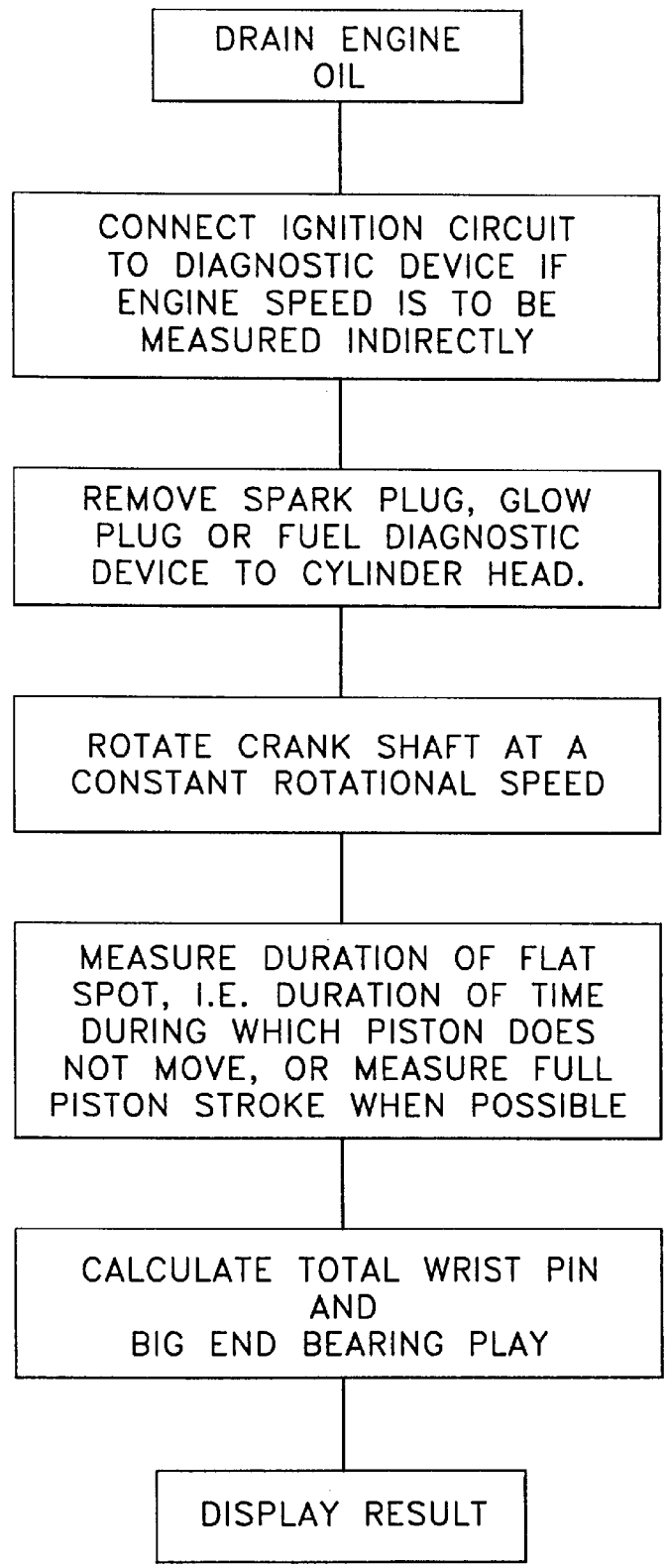
FIG. 6 is a flow chart of a method of using a piston engine bearing inspection device according to the present invention.

Referring to FIG. 6, the method of the present invention for determining the clearance of the connecting rod bearings is outlined in a flow chart. First the engine oil is drained. Next the crank shaft timing sensor is connected to the device 10 if an external timing signal is to be used. The source of this external timing signal can for example be the ignition circuit as was previously discussed. Thereafter, a spark plug, a glow plug, or a fuel injector is removed, depending on engine type, to provide access to the piston in the interior of the cylinder to be tested. The probe rod 16 is then passed through the opening created by the removal of the spark plug, glow plug, or fuel injector. The device 10 is then secured to the opening created by the removal of the spark plug, glow plug, or fuel injector.

When the probe rod 16 does not contact the piston at ninety degrees a correction factor can be used to correct the measurements of the linear position sensor 22 as previously discussed. The crank shaft is then rotated at a slow but constant speed ranging from one to several hundred revolutions per minute (RPM). Next the linear position sensor output is sampled to determine the amount of time the piston is not being moved after TDC.

The inspection tool 10 would then calculate from any measured and/or entered data the total of the connecting rod bearing clearances and display the result using the display 40. Compression data can also be obtained simultaneously using the pressure sensors 42 and 48. The remaining cylinders can be inspected in the same fashion.

Alternatively, the measurement could be made by monitoring the change in cylinder pressure instead of piston location as the piston cycle progresses through the flat spot, but this method could have lower accuracy as there is fluid leakage between the piston and the cylinder wall. In this method the ideal gas law would be used along with the measured cylinder pressure during the flat spot, ambient temperature, and the manufacturer's specified engine dimensions and geometry, to calculate piston position at TDC. The remainder of the calculations would be carried out as before.

It is to be understood that the present invention is not limited to the embodiments described above, but encompasses any and all embodiments within the scope of the following claims.

I claim:

1. A device for determining piston engine wear comprising:
    a sensor for determining the position of a piston within a cylinder of a piston engine, said sensor outputting a signal indicative of the position of the piston;
    an internal computer in communication with said sensor, said internal computer including
        means for calculating a rate of rotation of the piston engine by analyzing the signal output by said sensor to determine a periodic rate of recurrence of a period of time during each cycle of the engine during which the piston is motionless,
        means for calculating a duration of the period of time the piston is motionless by analyzing the signal output by said sensor, and
        means for calculating free play of the piston relative to an element of the piston engine connected to a connecting rod which is in turn connected to the piston based on the duration of the period of time the piston is motionless and the rate of rotation of the piston engine.

2. The device for determining piston engine wear according to claim 1, wherein said sensor includes a probe rod moveable in response to movement of the piston by contacting the piston during at least a portion of each cycle, and a linear position sensor operationally connected to said probe rod, said linear position sensor generating an electrical signal indicative of the position of the piston during the portion of each cycle.

3. The device for determining piston engine wear according to claim 2, wherein the portion of the cycle during which said probe rod contacts the piston lies between a crank angle of ninety degrees before top dead-center and a crank angle of ninety degrees after top dead-center.

4. The device for determining piston engine wear according to claim 2 further including a timing signal connection port for inputting a timing signal to said internal computer to allow said internal computer to calculate an angular position of the crank shaft.

5. The device for determining piston engine wear according to claim 4, further including a data input port for inputting data regarding new engine geometry, needed for calculation of the free play of the piston, and mode selection commands to said internal computer.

6. The device for determining piston engine wear according to claim 5, further including a computer interface port for allowing an external computer to communicate with said internal computer.

7. The device for determining piston engine wear according to claim 6, further including a display communicating with said internal computer to display the free play of the piston calculated by said internal computer.

8. The device for determining piston engine wear according to claim 7, further including a pressure sensitive sensor communicating with said internal computer to simultaneously perform one of a compression test and a cylinder leakage test along with determination of the free play of the piston.

9. The device for determining piston engine wear according to claim 8, wherein said internal computer includes a microcomputer.

10. The device for determining piston engine wear according to claim 1, wherein said sensor includes a pressure sensitive sensor to generate the signal indicative of the position of the piston, whereby cylinder pressure is used as an indicator of the position of the piston within the cylinder.

11. A method for determining piston engine wear comprising the steps of:
    rotating a crank shaft of the piston engine at a constant rate of rotation;
    determining the rate of rotation by measuring a periodic rate of recurrence of a period of time during each cycle of a piston within a cylinder of the piston engine during which the piston is motionless;
    determining a duration of the period of time during which the piston is motionless;
    calculating an angular rotation of the crank shaft during the period of time during which the piston is motionless; and
    calculating free play of the piston relative to a throw of the crank shaft connected to a connecting rod which is in turn connected to the piston, based on the angular rotation of the crank shaft and the duration of the period time during which the piston is motionless.

12. The method for determining piston engine wear according to claim 11, further including the step of displaying the free play of the piston on a display after said step of calculating free play of the piston.

13. A method for determining piston engine wear comprising the steps of:

connecting a pressure sensor to a cylinder of the piston engine;

rotating a crankshaft of the piston engine at a constant rate of rotation;

determining the rate of rotation by measuring a periodic rate of recurrence of a period of time during each cycle of a piston in the cylinder during which pressure within the cylinder is substantially constant;

determining a duration of the period of time during which pressure within a cylinder of an engine is substantially constant;

calculating an angular rotation of the crank shaft during the period of time during which the pressure within the cylinder is substantially constant; and calculating free play of the piston relative to a throw of the crank shaft connected to a connecting rod which is in turn connected to the piston, based on the angular rotation of the crank shaft and the duration of the period of time during which pressure within a cylinder of an engine is substantially constant.

14. The method for determining piston engine wear according to claim 13, further including the step of displaying the free play of the piston on a display after said step of calculating free play of the piston.

\* \* \* \* \*